(12) United States Patent
Terashita et al.

(10) Patent No.: US 11,274,945 B2
(45) Date of Patent: Mar. 15, 2022

(54) COORDINATE MEASURING MACHINE AND COORDINATE MEASURING PROGRAM

(71) Applicant: MITUTOYO CORPORATION, Kanagawa (JP)

(72) Inventors: Yo Terashita, Tochigi (JP); Seiko Kunihiro, Tochigi (JP); Hiroshi Kamitani, Tochigi (JP); Mitsuru Fukuda, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 159 days.

(21) Appl. No.: 16/885,922

(22) Filed: May 28, 2020

(65) Prior Publication Data

US 2020/0386579 A1    Dec. 10, 2020

(30) Foreign Application Priority Data

Jun. 5, 2019  (JP) .............................. JP2019-105359

(51) Int. Cl.
    *G01D 5/34*     (2006.01)
    *G01D 5/347*    (2006.01)

(52) U.S. Cl.
    CPC ..... *G01D 5/34738* (2013.01); *G01D 5/34792* (2013.01)

(58) Field of Classification Search
    CPC ........... G01D 5/34792; G01D 5/34738; G01B 11/005; G01B 21/047; G01B 5/008; G01B 5/20
    See application file for complete search history.

(56) References Cited

U.S. PATENT DOCUMENTS

| 6,519,860 | B1 * | 2/2003 | Bieg | .................. B23H 7/26 33/1 PT |
| 6,668,466 | B1 * | 12/2003 | Bieg | ..................... G01B 5/008 33/1 PT |
| 8,578,618 | B2 | 11/2013 | Majima et al. | |
| 10,094,685 | B2 | 10/2018 | Kimura et al. | |

(Continued)

FOREIGN PATENT DOCUMENTS

JP    2009-220119 A    10/2009
JP    2017-116306 A    6/2017

OTHER PUBLICATIONS

U.S. Appl. No. 16/811,420 to Yoshiaki Kato, filed Mar. 6, 2020.

*Primary Examiner* — Tony Ko
(74) *Attorney, Agent, or Firm* — Greenblum & Bernstein, P.L.C.

(57) ABSTRACT

A coordinate measuring machine including a surface plate; a probe moving body; an INC pattern and ABS pattern along a moving direction of the probe moving body; an INC detector that outputs a plurality of waveform signals in accordance with the moving amount based on the INC pattern; an ABS detector that outputs an absolute position signal of the probe moving body based on the ABS pattern in response to a request signal; and a control device that has a INC counting portion that counts the waveform signals outputted by the INC detector; a position information obtaining portion that reads a counted value at a timing when a work is detected by a probe; and a presetting portion that emits the request signal to the ABS detector to obtain the absolute position signal, and presets the counting portion to this absolute position signal.

5 Claims, 3 Drawing Sheets

(56) References Cited

U.S. PATENT DOCUMENTS

| | | |
|---|---|---|
| 10,190,892 B2 | 1/2019 | Kimura |
| 10,254,137 B2 * | 4/2019 | Kobayashi ......... G01D 5/34776 |
| 2017/0176218 A1 | 6/2017 | Kimura |

* cited by examiner

COORDINATE MEASURING MACHINE AND COORDINATE MEASURING PROGRAM

RELATED APPLICATIONS

This application claims the priority of Japanese Patent Application No. 2019-105359 filed on Jun. 5, 2019, which is incorporated herein by reference.

FIELD OF THE INVENTION

The present invention relates to a technique of shortening the time from power-on to completion of measurement preparation in coordinate measuring machines such as a three-dimensional measuring machine.

BACKGROUND OF THE INVENTION

In recent years, with respect to important inspection items related to the quality of the product, a total inspection for these products is increasingly required. Accordingly, with respect to devices, such as coordinate measuring machines, that performs important measurement related to the quality of the product, there is a big demand not only for improvement in measurement precision, but also for shortening of measurement time.

In general, a coordinate measurement machine comprises a probe moving body configured to move a probe in three directions, e.g. X-, Y-, Z-axis, with respect to a work. In accordance with a probe signal that is emitted when the probe detects the work, the coordinate measuring machine reads a position information of the probe moving body from a scale provided in each axial direction. The coordinate measuring machine is configured to measure a three-dimensional shape of the work by analyzing the position information.

In order to achieve improvement in measurement efficiency of coordinate measuring machines, i.e. shortening of measurement time, it is effective not only to speed up and/or accelerate/decelerate the probe moving body, but also to shorten the time from power-on to completion of measurement preparation.

Coordinate measuring machines usually read position information of the probe moving body from incremental type scales (hereinafter referred to as INC type). Owing to characteristics of INC type scales, an origin returning operation was necessary at power-on. This operation is to move the probe moving body to an origin that is set in advance, so that the probe moving body returns to the origin.

According to paragraph [0033] of Patent Literature 1, for example, in a well-known machining device that requires a highly precise positioning, a position control means controls to make a machining head return to a predetermined origin based on a present absolute position information obtained from an absolute type scale (hereinafter referred to as ABS type) upon the origin returning operation of the machining head at startup. To be more specific, according to paragraph [0035] of Patent Literature 1, after power-on, the position control means obtains a rough absolute position information of the machining head from the ABS type scale of the machining head. The rough position is "temporary preset" to the INC type scale. Then, based on the obtained absolute position, the machining head is moved to a detection start point of an origin mark. Then, the machining head is moved to a direction toward the origin mark, and, at a moment when the origin mark is detected, the value of the INC type scale is "permanently preset" to the value that is set in advance. Then, position control of the machining head is performed based on the value obtained from the INC type scale with a good control precision.

The aim of using the INC type scale and ABS type scale together in Patent Literature 1 is to omit conventional position detection operations performed by mechanical limit switches. It is not to omit the origin returning operation (detection operation of the origin mark) of the machining head.

Moreover, Patent Literature 2 discloses an example of a well-known INC type linear encoder. This device of Patent Literature 2 is configured to detect an origin position of a scale by an origin pattern (10) and a light receiving portion (52), and various improvements are provided thereto.

In coordinate measuring machines, the time required for the origin returning operation of the probe moving body upon power-on depends on the position of the probe moving body at power-on. When the action is started at the furthest position from the origin mark, it will take about one minute in medium sized devices, and about three minutes in large sized devices.

It is already ineffective to perform the origin returning operation once a day, and if an unexpected error occurs after completion of measurement preparation and the power is to be turned on again, ineffective time will be doubled. For example, if re-turning on of the power is five times a day, five minutes in medium sized devices and fifteen minutes for large sized devices will be wasted. If re-turning on of power is ten times a day, ten minutes in medium sized devices and thirty minutes for large sized devices will be wasted.

Moreover, when operation procedure is determined such that the power of the coordinate measuring machine is turned off every time the work is carried in/out in terms of safety, re-turning on of power will be several tens of times a day, and measurement efficiency will be remarkably decreased.

PRIOR ART LITERATURES

Patent Literature

PATENT LITERATURE 1: Japanese Unexamined Patent Publication No. 2009-220119 A
PATENT LITERATURE 2: Japanese Unexamined Patent Publication No. 2017-116306 A

DISCLOSURE OF THE INVENTION

Problem to be Solved by the Invention

There is an opinion that the time of the origin returning operation in the INC type scale can be omitted if the absolute position information of the probe moving body is read by the ABS type scale, instead of the INC type scale. In the INC type scale, a relative position information of the probe moving body is obtained by counting an amount of movement from the origin position obtained at the origin returning operation. On the other hand, in the ABS type scale, the origin position is unnecessary, and the absolute position information can be obtained at that position by reading the scale at an optional position. However, there were following problems in applying ABS type scales in coordinate measuring machines.

There is a coordinate measuring machine that measures a surface shape of a work by controlling driving of a probe moving body to scan along a work surface by a scanning probe, and sequentially reading a moving position of the probe moving body from a scale. In this case, a control device of the coordinate measuring machine sequentially obtains a probe signal from the moving probe, and reads each position information of the probe moving body by having this probe signal as a trigger.

In ABS type linear encoders, usually, an ABS detector that reads an absolute position information of a scale, and an encoder interface (hereinafter referred to as encoder I/F) are connected by a serial communication line. In response to a request signal emitted by the encoder I/F, the ABS detector is configured to output the absolute position information.

When applying ABS type linear encoders in coordinate measuring machines, the absolute position information of the probe moving body is obtained as follows. First, a control device of the coordinate measuring machine receives a probe signal from a probe. Then, the control device emits a request signal toward an ABS detector. The ABS detector outputs an absolute position information at the time when the request signal is received toward the control device. Then, the request signal and a signal of the absolute position information that is a response thereto are transferred between the control device and the ABS detector. Since a time lag occurs between the timing when the control device of the coordinate measuring machine receives the probe signal and the timing when the ABS detector emits the absolute position information, the absolute position information (true value) at the time of receiving the probe signal may not be obtained. In this configuration, the control device obtains the position information that is delayed for at least one sample time.

Obtaining the position information delayed for one sample time means that an error in time is added to the measurement value, and it is problematic for the function of "obtaining the position coordinate to measure the length while the probe is moving" of coordinate measuring machines.

The object of the present invention is to provide a coordinate measuring machine that is capable of shortening the time from power-on to completion of measurement preparation without deteriorating a highly precise measuring function, and a coordinate measuring program.

Means to Solve the Problem

The present inventors focused on the following points: omitting a returning operation to a machine origin by using the advantage of ABS type scales; and obtaining a position information in real-time by using the advantage of INC type scales. They advanced with development in a coordinate measuring machine configured to perform presetting by the ABS type scale upon power-on, and read a highly precise position information by the INC type scale upon a following work-shape measurement; and thereby accomplished the present invention. As a specific example, an "ABS-INC scale" is mounted to the coordinate measuring machine, and a "means to execute presetting of an incremental counter (hereinafter referred to as INC counter) by using an absolute position signal from an ABS detector upon power-on" and a "means to read a count value of the INC counter upon work-shape measurement by using the probe signal as a trigger". As a result, they found that the return operation of the probe moving body to the machine origin upon power-on can be omitted, and a high precision in work-shape measurement performed by the scanning probe can be maintained.

That is, a coordinate measuring machine according to the present invention comprises:

a work supporting body that supports a work;

a probe moving body that moves a probe relative to the work; and a control device that controls driving of the probe moving body to obtain a position information of the probe moving body at a timing when the probe detects the work; the coordinate measuring machine that measures a work shape based on the position information further comprises:

an incremental pattern aligned along a moving direction of the probe moving body; an absolute pattern aligned along the moving direction of the probe moving body; an incremental detector that detects the incremental pattern to output a plurality of waveform signals proportional to a moving amount of the probe moving body; and an absolute detector that detects the absolute pattern at a timing when a request signal from the control device is received to output an absolute position signal of the probe moving body, and the control device comprises:

an incremental counting means that counts the waveform signals from the incremental detector;

a position information obtaining means that reads a count value of the incremental counting means at the timing when the probe detects the work; and a presetting means that sends the request signal to the absolute detector for presetting the incremental counting means to obtain the absolute position signal from the absolute detector, and preset the incremental counting means to the absolute position signal.

According to this configuration, the control device of the coordinate measuring machine operates as follows. First, upon power-on, the "presetting means" uses the absolute position signal from the ABS detector to execute presetting of the INC counting means. Accordingly, the origin returning operation of the probe moving body at presetting becomes unnecessary, so that the time for preparation from power-on to completion of measurement preparation is greatly shortened. Next, during the work-shape measurement, the "INC counting means" counts the plurality of waveform signals according to the moving amount of the probe moving body based on a preset value, so that the "position information obtaining means" immediately reads the count value of the INC counting means at a timing when a probe signal is received, and can output this count value as the position information of the probe moving body. Accordingly, the position information (true value) at a time when the probe signal is received can be obtained, and error in time does not occur at obtaining the position information of the probe.

However, it is costly to provide two scales of ABS type and INC type along the moving direction of the probe moving body. Therefore, in the coordinate measuring machine according to the present invention, the incremental pattern and the absolute pattern are preferably formed on one scale. If two types of scales of ABS and INC are formed on one scale, it is enough to provide one scale, and increase in cost can be suppressed at minimum. Such complex scale is referred to as an ABS-INC scale in the present invention.

Moreover, in the coordinate measuring machine according to the present invention, the control device comprises a servo-locking portion that controls servo locking of a servo motor for driving the probe moving body. During presetting operation performed by the presetting means, the servo-locking portion is preferably configured to servo lock the servo motor (maintain a predetermined rotation angle of the servo motor) to stop rotation. In this configuration, upon presetting of the INC counting means, the probe moving body is completely stopped by servo lock, so that reliability of presetting operation improves.

The coordinate measuring program according to the present invention is to measure a work shape by obtaining a position information of a probe moving body at a timing when a probe detects a work, the coordinate measuring program that makes a computer to function as:

an incremental counting means that obtains a plurality of waveform signals proportional to the moving amount of the probe moving body from the incremental detector to count the waveform signals;

a position information obtaining means that reads a count value of the incremental counting means at the timing when the probe detects the work; and a presetting means that emits a request signal to an absolute detector for presetting the incremental counting means to obtain an absolute position signal of the probe moving body from the absolute detector and preset the incremental counting means to the absolute position signal.

A non-transitory computer-readable storage medium according to the present invention storing a coordinate measuring program to measure a work shape by obtaining a position information of a probe moving body at a timing when a probe detects a work, the coordinate measuring program for causing a computer to execute processing comprising:

incremental counting a plurality of waveform signals proportional to the moving amount of the probe moving body from an incremental detector;

reading a count value in the incremental counting at the timing when the probe detects the work;

position information obtaining of the probe moving body based on the count value;

emitting a request signal to an absolute detector for presetting the count value at the incremental counting;

obtaining an absolute position signal of the probe moving body from the absolute detector; and presetting the count value of the incremental counting to the absolute position signal.

According to this configuration of the program, in addition to the above-described effects, automation of work-shape measurement and remote control via wired or wireless network can be accomplished.

Effect of the Invention

According to the configuration of the present invention, by using the configuration of ABS type scales, the origin returning operation of the probe moving body that was necessary for presetting the INC counting means can be abolished, and a highly precise measurement of work shapes that uses the configuration of the INC type scale can be maintained upon measurement by probes.

BEST MODE FOR CARRYING OUT THE INVENTION

Figure 1:
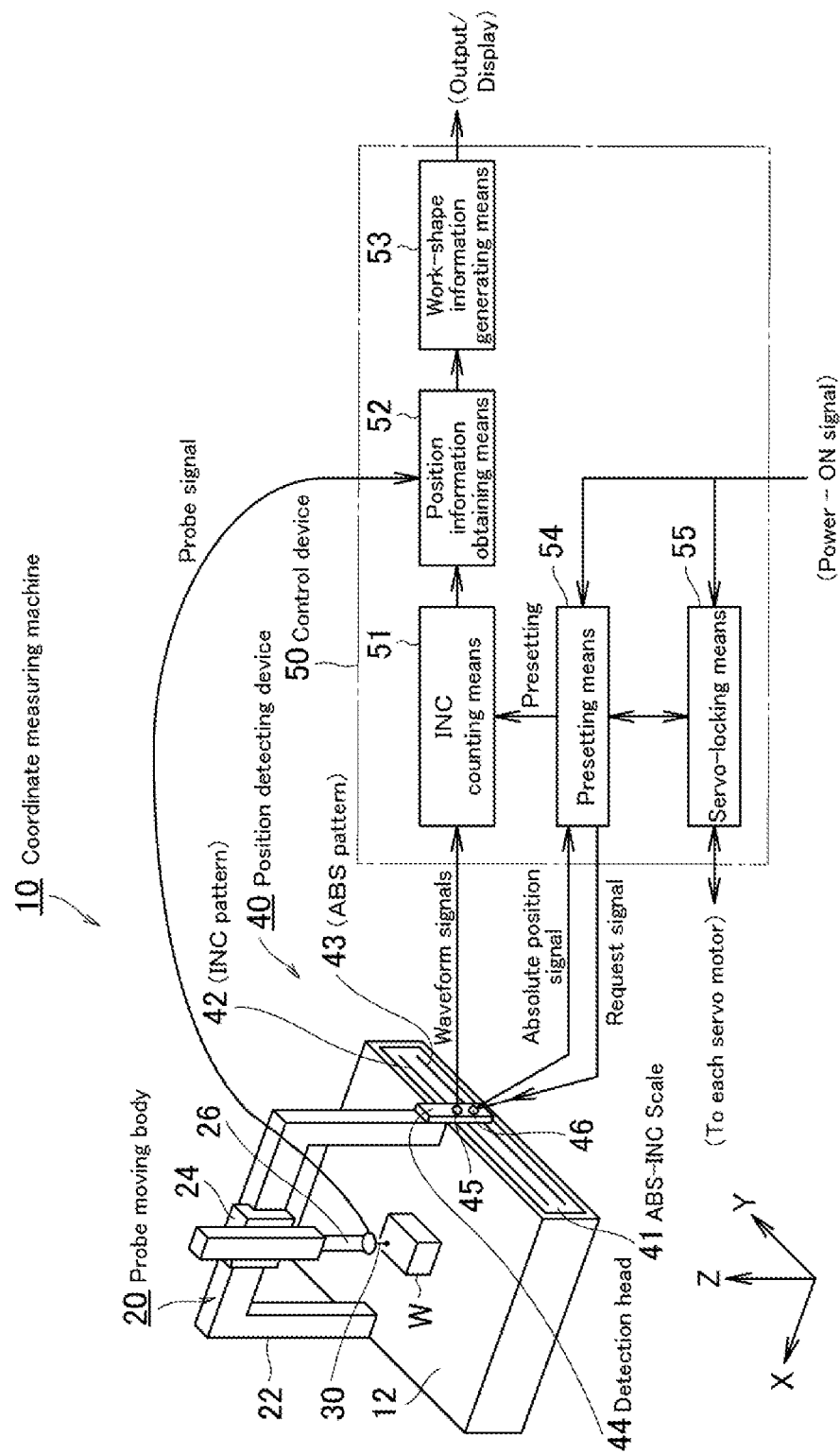
FIG. 1 is a block diagram that shows a total configuration of a coordinate measuring machine of a first embodiment.

FIG. 1 is a block diagram that shows a configuration example of a coordinate measuring machine according to a first embodiment of the present invention. A coordinate measurement machine 10 comprises: a surface plate 12 for placing a work; a bridge-type probe moving body 20 that can slide on the surface plate 12 in Y-direction; a probe 30 supported by this probe moving body 20; a position detecting device 40 that detects a position of the probe moving body 20 in Y-direction; and a control device 50.

The probe moving body 20 comprises: a bridge-type Y slider 22; an X slider 24 that can slide along a horizontal beam of this Y slider 22; and a Z spindle 26 supported to the X slider 24 in an elevatable state. Although it is not shown in the drawings, these sliders and spindle are moved by a well-known driving means. In the present embodiment, a servo motor is employed as the driving means, for example. Moreover, a position detecting means that detects positions of the moving direction of the sliders and spindle are disposed in each direction. Here, the position detecting device 40 in Y-direction as a representative is described in detail.

The coordinate measuring machine 10 of FIG. 1 configured with the surface plate 12 and the bridge-type probe moving body 20 is merely an example, and the work supporting body and the probe moving body may be configured such that at least the probe 30 is moved relatively to the work (W). For example, a movable stage that can move the work in Y-direction may be employed as the work supporting body, and the probe moving body may be fixed in Y-direction.

The probe 30 is mounted to a lower end of the Z spindle 26, and a sensor is incorporated thereto. When the probe 30 contacts the work, or detects the work without contact, it outputs a signal showing that the work is detected. This signal is called as a probe signal.

The position detecting device 40 has a long ABS-INC scale 41, and a detecting head 44. The ABS-INC scale 41 is fixed to a side face of the surface plate 12 along the moving direction of the Y slider 22. The detecting head 44 is mounted to the lower part of a driving side column of the Y slider 22 so that a detection face faces a pattern face of the ABS-INC scale 41, and the detecting head 44 moves integrally with the Y slider 22.

On the surface of the scale 41, the pattern face including two patterns of an INC pattern 42 and an ABS pattern 43 is formed along a long direction of the scale 41. On the detection face of the detecting head 44, an INC detector 45 and an ABS detector 46 are disposed to oppose to the INC pattern 42 and the ABS pattern 43 of the scale 41, respectively. Owing to such position relationship between the scale 41 and the detecting head 44, when the probe moving body 20 moves in Y-direction, the INC detector 45 detects the INC pattern 42 on a part corresponding to the moving position, and the ABS detector 46 detects a part of the ABS pattern 43, similarly.

The INC pattern 42 may be configured in a plurality of rectangular patterns aligned at a constant pitch, for example. In this case, when the INC detector 45 passes one rectangular pattern in accordance with the movement of the probe moving body 20, the INC detector 45 outputs one waveform signal (e.g. pulse signal). Thus, the INC detector 45 outputs a plurality of waveform signals proportional to the moving amount of the probe moving body 20, and transmits the waveform signals as an analogue or digital signal to the control device 50. Accordingly, as the waveform signal outputted by the INC detector 45, signals that can be outputted continuously, or can be counted by a counting means such as a counter are suitable.

The ABS pattern 43 may be configured in a pattern that depends on a relative position of the scale and the detecting head, such as one that contains data of M-sequence signs, for example. In this case, when the ABS detector 46 detects a part of the ABS pattern 43, the ABS detector 46 reads an address information or the like assigned to the long direction of the ABS pattern 43, outputs the absolute position information that differ in each moving position of the detecting head 44, and transmits the absolute position information as a digital signal to the control device 50.

The control device 50 is configured with various function blocks such as an INC counter 51, a position information obtaining means 52, a work-shape information generating means 53, a presetting means 54, and a servo-locking means 55.

Moreover, the control device 50 is configured such that it can perform, with external devices, the following operations: reception of a signal showing that the power is turned on; two-way communication between the ABS detector 46 (e.g. serial communication); reception of the waveform signals from the INC detector 45; and reception of the probe signal.

<INC Counting Means>

The function of the INC counting means 51 is to sequentially count the waveform signals which are emitted from the INC detector 45 unilaterally.

<Position Information Obtaining Means>

The function of the position information obtaining means 52 is to read the count value of the INC counting means 51 at a timing when the probe signal is received, and output this count value as a present position information of the probe moving body 20. Here, the position information obtaining means 52 is configured such that the present position information is outputted immediately after reading the count value at the timing of receiving the probe signal; however, the position information obtaining means 52 may be configured such that the count value is stored in a storing means for a while, and then the count value of the storing means is outputted together with an obtaining time information, or the like.

<Work-Shape Information Generating Means>

The function of the work-shape information generating means 53 is to generate a trace of the probe, that is, to generate a work-shape information based on the present position information from the position information obtaining means 52.

<Presetting Means>

The function of the presetting means 54 is: to receive a preset execution command caused upon power-on, and emit a request signal to the ABS detector 46; or to obtain the absolute position signal from the ABS detector 46, and preset the INC counting means 51 to this absolute position signal. The presetting means 54 is connected to the ABS detector 46 by serial communication, and is configured to operate in request and response formats.

<Servo-Locking Means>

The function of the servo-locking means 55 is to control servo locking of a servo motor for driving the probe moving body 20. During presetting operation performed by the presetting means 54, this servo-locking means 55 servo locks (controls to maintain the servo motor at a predetermined rotation angle) the servo motor to stop the rotation of the motor. By providing this servo-locking means 55, the probe moving body 20 is completely stopped by servo lock upon presetting the INC counting means 51, so that reliability of presetting operation improves.

The control device 50 configured as above can perform the following steps including the presetting operation without moving the probe moving body 20 at all in the stopping position of the prove moving body 20 upon power-on.

(1) A signal of a preset execution command (preset trigger) caused by power-on is inputted to the presetting means 54 and the servo-locking means 55. In accordance with this signal, the servo-locking means 55 sends a command signal for to electrically servo-lock the servo motor of the probe moving body 20. Then, after confirming that the rotation angle of the servo motor is maintained at the predetermined angle, the servo-locking means 55 outputs a signal showing a servo-locked state to the presetting means 54.

(2) When the presetting means 54 receives each signal of preset execution command and servo-locked state, the presetting means 54 emits a request signal toward the ABS detector 46.

(3) The ABS detector 46 outputs an absolute position signal that is read from the ABS pattern 42 upon receiving the request signal.

(4) Based on the received absolute position signal, the presetting means 54 presets the count value of the INC counting means 51 to a value of the absolute position signal.

(5) The presetting means 54 outputs a signal of preset completion to the servo-locking means 55. The servo-locking means 55 sends a command signal to unlock servo lock of the servo motor. The presetting operation is completed by the above-described steps, and thus measurement preparation is completed.

Moreover, the control device 50 performs the work-shape measurement operation including the following steps.

(6) After completion of the presetting operation, the INC counting means 51 counts the waveform signals from the INC detector 45 based on the preset count value. For example, the count value is added when the Y slider 22 goes forward, and subtracted when the Y slider 22 goes backward.

(7) When the position information obtaining means 52 receives the probe signal, it immediately reads the count value of the INC counting means 51. Then, the position information obtaining means 52 outputs this count value toward the work-shape information generating means 53.

(8) The work-shape information generating means 53 obtains a large amount of the count values from the position information obtaining means 52, i.e. the present position informations of the probe moving body 20 at the plural timing when the probe signals are received. Based on these present position informations, the work-shape information generating means 53 generates a work-shape information, and stores the work-shape information to a storing means. The work-shape information is displayed to a displaying means, as necessary, and is outputted to the outside.

The control device 50 may be configured with devices that comprise a computer. In this case, the computer executes a coordinate measuring program including the steps of (1) to (8), so that the functions of the function blocks shown in FIG. 1 are exerted, respectively. By using the coordinate measuring program, automation of the work-shape measurement with a computer and remote control via a wired or wireless network become easy.

Figure 2:
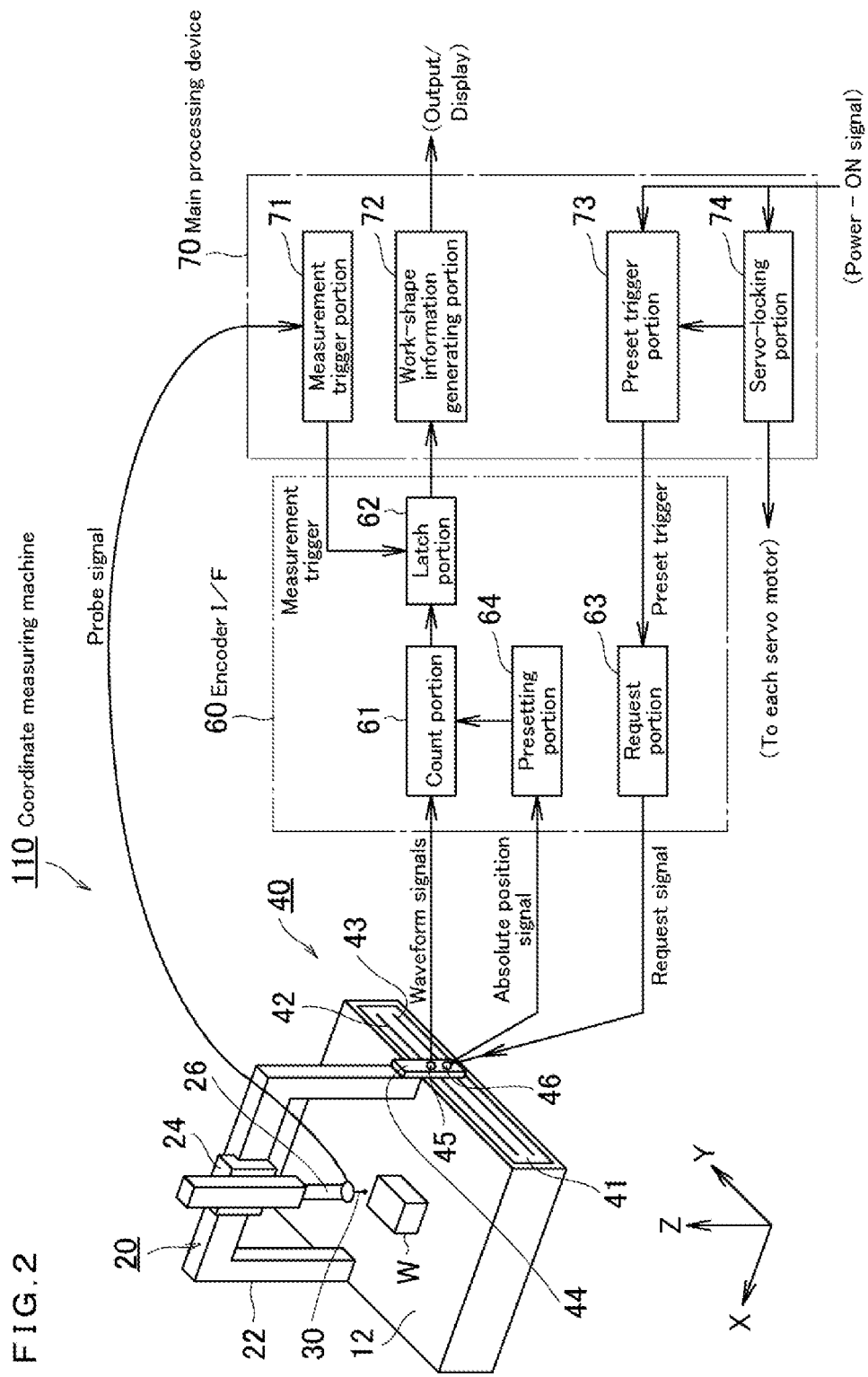
FIG. 2 is a block diagram that shows a total configuration of a coordinate measuring machine of a second embodiment.

FIG. 2 is a block diagram showing a configuration example of a coordinate measuring machine according to a second embodiment of the present invention. Here, the control device 50 of the first embodiment is separated into an encoder I/F 60 and a main processing device 70. The components related to the configuration of the first embodiment are assigned with reference numbers same to the reference numbers of FIG. 1.

In the coordinate measuring machine 110 of FIG. 2, the encoder I/F (encoder-interface) 60 can be configured in a combination of an encoder I/F of the INC type scale and an encoder I/F of the ABS type scale. In this case, the ABS type scale performs presetting of the counter, and the INC type scale obtains the present position information of the probe moving body 20.

As shown in FIG. 2, the encoder I/F 60 is configured with various function blocks such as a count portion 61, a latch portion 62, a request portion 63, a preset portion 64, and the like. The encoder I/F 60 may be configured with a device comprising a computer. In this case, the computer executes the coordinate measuring program for this encoder I/F 60, so that the functions of the function blocks included in the encoder I/F 60 are exerted, respectively.

The main processing device (host computer) 70 is configured with various function blocks such as a measurement trigger portion 71, a work-shape information generating portion 72, a preset trigger portion 73, a servo-lock portion 74, and the like. The coordinate measuring program for the main processing device 70 is executed, so that the functions of these function blocks are exerted, respectively. The main processing device 70 is configured to control driving of the coordinate measuring machine 110, and to be capable of executing necessary data processing.

Figure 3:
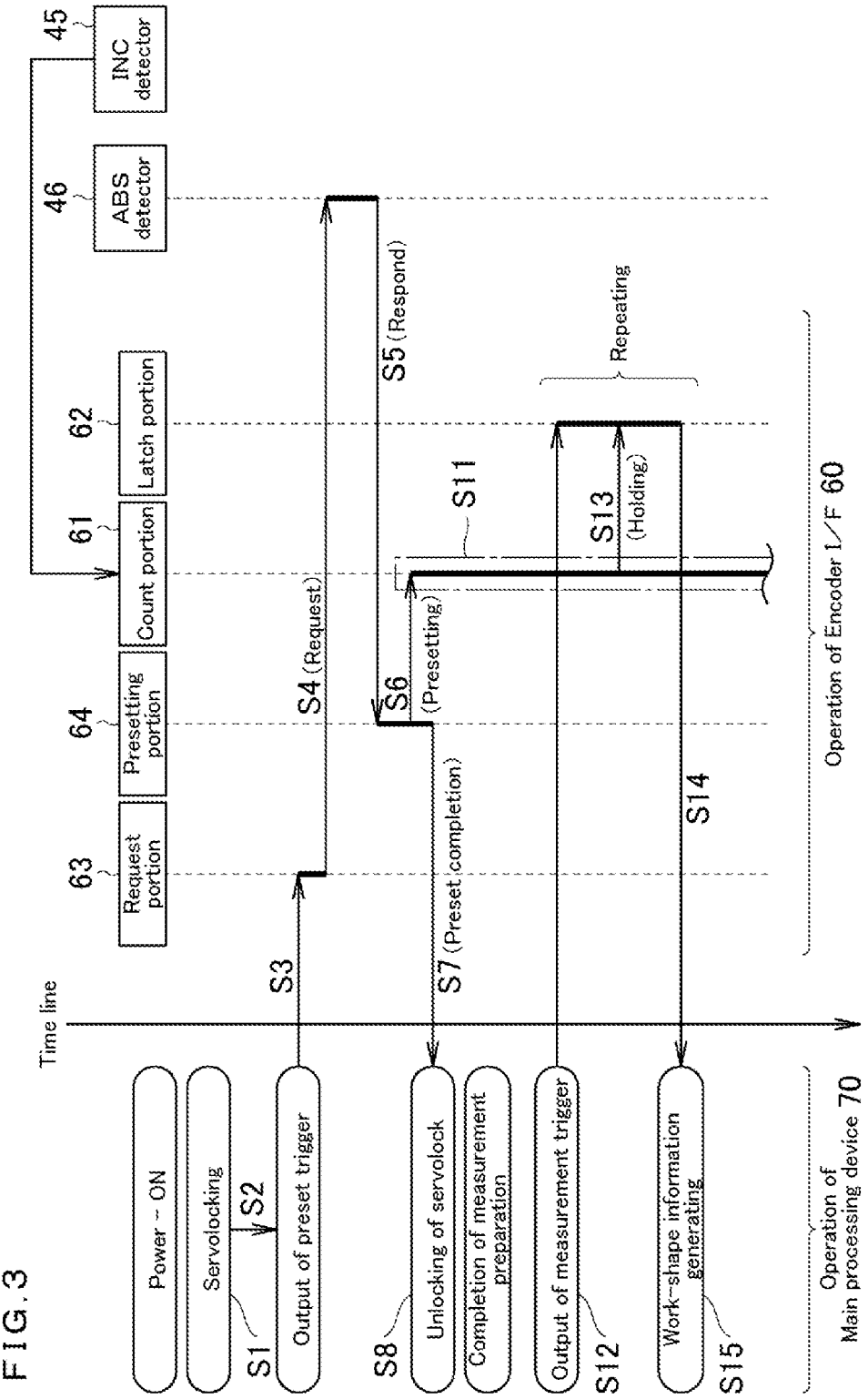
FIG. 3 is a time chart of coordinate measurement by the coordinate measuring machine of the embodiment.

The presetting operation in the present embodiment is described with FIGS. 2 and 3. FIG. 3 is a time chart of the coordinate measuring program consisting of the procedures from power-on to completion of measurement preparation, and the procedures upon work-shape measurement.

(1) When the power of the coordinate measuring machine 110 is turned on, a power-on signal is inputted to the main processing device 70. When the servo-lock portion 74 of the main processing device 70 confirms the power-on signal, the servo-lock portion 74 sends a command signal to electrically servo-lock the servo motor of the probe moving body 20 (S1). Moreover, after confirming that the servo motor is servo-locked, the servo-locking portion 74 outputs a servo-lock signal that shows a servo-locked state to the preset trigger portion 73 (S2).

(2) When the preset trigger portion 73 receives the power-on signal and the servo-lock signal, the preset trigger portion 73 outputs a preset trigger signal toward the encoder I/F 60 (S3).

(3) When the request portion 63 of the encoder I/F 60 confirms the preset trigger signal, the request portion 63 emits a request signal toward the ABS detector 46 (S4).

(4) Upon reception of the request signal, the ABS detector 46 reads an absolute position signal from the ABS pattern 43, and sends (responds) this absolute position signal to the encoder I/F 60 (S5).

(5) Based on the received absolute position signal, the preset portion 64 of the encoder I/F 60 presets the count value of the count portion 61 to the value of the absolute position signal (S6). The request portion 63 and the preset portion 64 are the components that configure the presetting means of the present invention.

(6) Moreover, the presetting means 64 outputs a preset completion signal to the servo-lock portion 74 of the main processing device 70 (S7). The servo-lock portion 74 sends an unlocking command signal of the servo lock (S8). The presetting operation is completed by the above steps, and thus measurement preparation is completed.

Next, the work-shape measurement operation is described.

(7) After completion of the presetting operation, the count portion 61 of the encoder I/F 60 counts the waveform signals from the INC detector 45 based on the preset count value (S11).

(8) When the work-shape measurement is started and the probe 30 detects the work, the probe signal is inputted to the main processing device 70. When the measurement trigger portion 71 of the main processing device 70 confirms the probe signal, the measurement trigger portion 71 outputs a measurement trigger signal toward the encoder I/F 60 (S12).

(9) When the latch portion 62 of the encoder I/F 60 confirms the measurement trigger signal, the latch portion 62 holds the count value of the count portion 61 (S13), and outputs the held count value toward the main processing device 70 (S14). The latch portion 62 is the component that configures the position information obtaining means of the present invention. The operations of the steps S12 to S14 are repeated.

(10) The work-shape information generating portion 72 of the main processing device 70 obtains a large amount of the count values from the encoder I/F 60, i.e. the present position informations of the probe moving body 20 at the plural timing when the probe signal are received, and generates a work-shape information based on these present position informations (S15).

According to the coordinate measuring machines 10, 110 of the embodiments, upon power-on, the motor is servo-locked to obtain the coordinate value of the absolute position of the probe moving body 20 by the configuration of the ABS type scale. Then, the configuration of the INC type scale is preset to the obtained coordinate value to perform the following work-shape measurement by the configuration of the preset INC type scale.

Accordingly, the mechanical origin returning operation of the probe moving body 20, which was necessary in the configuration of the INC type scale, can be abolished, and the problem of deviation of the true value, of which a time error is added to the measurement value, in the configuration of the ABS type scale can be solved. That is, the time from power-on to completion of measurement preparation is shortened, so that shortening of measurement time and downtime can be achieved, and a highly efficient measurement becomes possible. In addition, the work-shape measurement can be maintained with high precision without deteriorating precision of the work-shape measurement.

In Patent Literature 1, after confirming the rough position by the ABS type scale in a measurement preparation stage, it was necessary to move the head to the origin point of the INC type scale, and determine the coordinate value at the origin point. On the contrary, in the coordinate measuring machine 10, 110 of the embodiments, the accurate position is detected by the ABS type scale, and the coordinate value can be determined at that position without moving the probe moving body 20 after detection.

Moreover, in the coordinate measuring machine 10, 110 of the embodiments, the ABS-INC scale 41 is used. Since two patterns 42, 43 of ABS and INC are formed on one identical scale 41, only one scale 41 is needed to be disposed in the position detecting device 40 in one direction, so that increase in cost can be suppressed to minimum. Furthermore, even when one pattern (scale) is damaged, the work-shape measurement can be continued without stopping the operation of the coordinate measuring machines 10, 110 if the other pattern is normal.

Position detection of the Y slider 22 (corresponds to Y-direction probe moving body) is described in the above description; however, a similar configuration can be applied to position detection of the X slider 24 (corresponds to X-direction probe moving body) or the Z spindle (corresponds to the Z-direction probe moving body). In this case, the work-shape information generating means 53 or the work-shape information generating portion 72 reads the present position information of the probe 30 from the scale of each axis, so that a three-dimensional shape information of the work can be efficiently measured at high precision based on the read position information of each axis.

DESCRIPTION OF REFERENCE NUMBERS

10 Coordinate measuring machine; 12 Surface plate (work supporting body); 20 Probe moving body; 30 Probe; 41 ABS-INC scale (scale); 42 Incremental pattern (INC pattern); 43 Absolute pattern (ABS pattern); 45 Incremental detector (INC detector); 46 Absolute detector (ABS detector); 50 Control device; 51 Incremental counting means (INC counting means); 52 Position information obtaining means; 53 Work-shape information generating means; 54 Presetting means; 55 Servo-locking means; 60 Encoder I/F; 61 Count portion; 62 Latch portion (position information obtaining means); 63 Request portion (presetting means); 64 Presetting portion (presetting means); 70 Main processing device; 71 Measurement trigger portion; 72 Work-shape information generating portion; 73 Preset trigger portion; 74 Servo-lock portion (servo-locking means); 110 Coordinate measuring machine.

The invention claimed is:

1. A coordinate measuring machine comprising:
a work supporting body that supports a work;
a probe moving body that moves a probe relative to the work; and
a control device that controls driving of the probe moving body to obtain a position information of the probe moving body at a timing when the probe detects the work; the coordinate measuring machine that measures a work shape based on the position information further comprises:
an incremental pattern aligned along a moving direction of the probe moving body; an absolute pattern aligned along the moving direction of the probe moving body; an incremental detector that detects the incremental pattern to output a plurality of waveform signals proportional to a moving amount of the probe moving body; and an absolute detector that detects the absolute pattern at a timing when a request signal from the control device is received to output an absolute position signal of the probe moving body, wherein
the control device comprises:
an incremental counting portion that counts the waveform signals from the incremental detector;
a position information obtaining portion that reads a count value of the incremental counting portion at the timing when the probe detects the work; and
a presetting portion that sends the request signal to the absolute detector for presetting the incremental counting portion to obtain the absolute position signal from the absolute detector, and preset the incremental counting portion to the absolute position signal.

2. The coordinate measuring machine according to claim 1, wherein
the incremental pattern and the absolute pattern are formed on one scale.

3. The coordinate measuring machine according to claim 1, wherein
the control device comprises a servo-locking portion that controls servo locking of a servo motor, which is a motor for driving the probe moving body, and
during presetting performed by the presetting portion, the servo-locking portion is configured to servo lock the servo motor to stop rotation.

4. The coordinate measuring machine according to claim 2, wherein
the control device comprises a servo-locking portion that controls servo locking of a servo motor, which is a motor for driving the probe moving body, and
during presetting performed by the presetting portion, the servo-locking portion is configured to servo lock the servo motor to stop rotation.

5. A non-transitory computer-readable storage medium storing a coordinate measuring program to measure a work shape by obtaining a position information of a probe moving body at a timing when a probe detects a work,
the coordinate measuring program for causing a computer to execute processing comprising:
incremental counting a plurality of waveform signals proportional to the moving amount of the probe moving body from an incremental detector;
reading a count value in the incremental counting at the timing when the probe detects the work;
position information obtaining of the probe moving body based on the count value;
emitting a request signal to an absolute detector for presetting the count value at the incremental counting;
obtaining an absolute position signal of the probe moving body from the absolute detector; and
presetting the count value of the incremental counting to the absolute position signal.

* * * * *